United States Patent [19]

Kita et al.

[11] Patent Number: 5,534,370
[45] Date of Patent: Jul. 9, 1996

[54] ORGANIC ELECTROLYTIC SOLUTION CELL

[75] Inventors: Fusaji Kita; Kouji Murakami; Masaharu Higashiguchi; Akira Kawakami; Ginnosuke Tanaka, all of Osaka, Japan

[73] Assignee: Hitachi Maxell, Ltd., Osaka-fu, Japan

[21] Appl. No.: 262,317

[22] Filed: Jun. 17, 1994

[30] Foreign Application Priority Data

Jun. 18, 1993 [JP] Japan .................................. 5-172333

[51] Int. Cl.$^6$ .................................................. H01M 10/40
[52] U.S. Cl. ........................ 429/198; 429/200; 429/203
[58] Field of Search ................................. 429/198, 203, 429/194, 200

[56] References Cited

U.S. PATENT DOCUMENTS

| | | | |
|---|---|---|---|
| 3,887,397 | 6/1975 | Horning | 429/194 |
| 4,377,625 | 3/1983 | Parsen et al. | 429/198 |
| 5,128,222 | 7/1992 | Yoshizawa et al. | 429/198 X |
| 5,350,646 | 9/1994 | Armand et al. | 429/198 X |
| 5,352,547 | 10/1994 | Kita et al. | 429/198 X |

OTHER PUBLICATIONS

J. Bassett and P. J. Matthews, "The Preparation And Properties Of Some Bis (Salicylato) Borate (III) Salts With Large Cations", pp. 987–992 J. of Inorg. and Nucl. Chem. vol. 40, 1978 (Month Unknown).

*Primary Examiner*—Stephen Kalafut
*Attorney, Agent, or Firm*—Birch, Stewart, Kolasch & Birch

[57] ABSTRACT

An organic electrolytic solution cell having a positive electrode, a negative electrode which is made of an alkali metal or a compound containing an alkali metal, and an organic electrolytic solution which contains, as an electrolyte, an organic metal salt containing an atom selected from the elements of IIIb to Vb groups of the Periodic Table which forms an anion center and an electron attractive organic group bonded to the atom through an oxygen atom, or an organic metal salt having an atom which forms an anion center and a counter cation in a molar ratio of the counter cation to the anion center atom of larger than 1, which cell has excellent shelf stability.

17 Claims, 1 Drawing Sheet

Figure
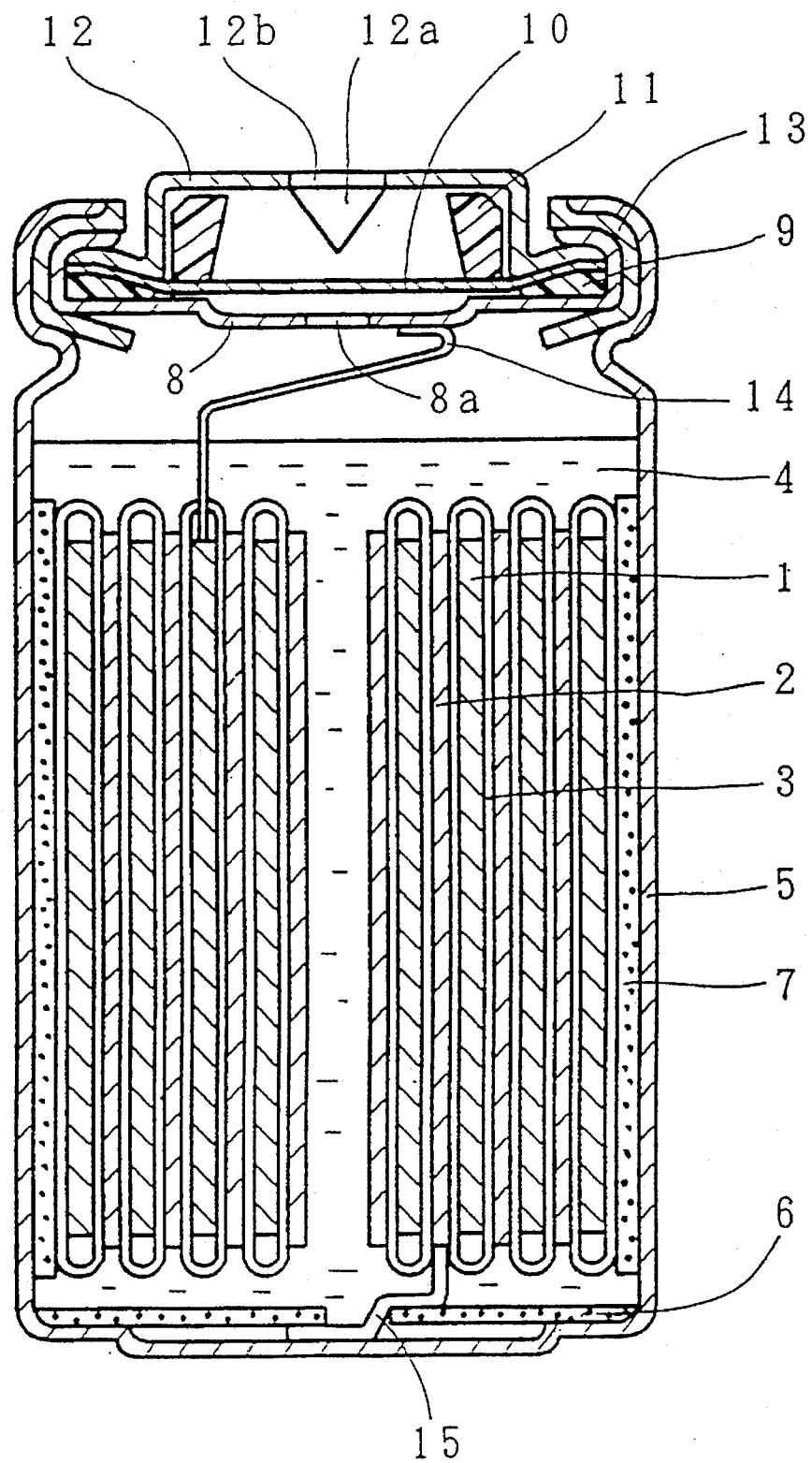

ORGANIC ELECTROLYTIC SOLUTION CELL

BACKGROUND OF THE INVENTION

1. Field of the Invention

The present invention relates to an organic electrolytic solution cell which has good shelf stability.

2. Description of the Related Art

Organic electrolytic solution cells, a typical example of which is a manganese dioxide-lithium cell, are increasingly used, since they generate a high voltage and have a high energy density.

A perchlorate base electrolyte such as $LiClO_4$ is generally used as an electrolyte to be contained in an electrolytic solution used in such an organic electrolytic solution cell. Recently, in view of safety of the cells, it has become undesirable to use dangerous materials such as $LiClO_4$ in the cells.

Apart from $LiClO_4$, boron lithium salts such as $LiBF_4$ or $LiB(C_6H_5)_4$ are used as the lithium salt electrolytes.

However, when such a boron lithium salt is used as the electrolyte, the electrolytic solution tends to be discolored or polymerizes some kinds of media of the electrolytic solution during storage. When such electrolytic solution is used in the cell, a shelf stability of the cell is shortened.

SUMMARY OF THE INVENTION

One object of the present invention is to provide an organic electrolytic solution cell in which the electrolyte is not discolored or does not polymerize a medium.

Another object of the present invention is to provide an organic electrolytic solution cell which has a long shelf stability.

According to a first aspect of the present invention, there is provided an organic electrolytic solution cell comprising a positive electrode, a negative electrode which is made of an alkali metal or a compound comprising an alkali metal, and an organic electrolytic solution which contains, as an electrolyte, an organic metal salt comprising an atom selected from the group consisting of the elements of IIIA to VA groups of the Periodic Table which forms an anion center and an electron attractive organic group bonded to said atom through an oxygen atom.

According to a second aspect of the present invention there is provided an organic electrolytic solution cell comprising a positive electrode, a negative electrode which is made of an alkali metal or a compound comprising an alkali metal, and an organic electrolytic solution which contains, as an electrolyte, an organic metal salt comprising an atom which forms an anion center and a corresponding cation in a molar ratio of said corresponding cation to said anion center atom of larger than 1.

BRIEF DESCRIPTION OF THE DRAWINGS

The Figure shows a cross sectional view of an organic electrolytic solution cell.

DETAILED DESCRIPTION OF THE INVENTION

One of the characteristics of the present invention is that the above specific organic metal salt is used as an electrolyte of the electrolytic solution cell.

The atom of the groups IIIA, IVA, and VA forming the anion center, for example, boron (B), nitrogen (N), phosphorus (P), gallium (Ga), aluminum (Al), silicon (Si) and the like, has a smaller electronegativity than the atoms of the VIA group, such as oxygen (O) and sulfur (S). In the case where the electrolyte comprises the atoms of the IIIA to VA groups which forms the anion center, when the cell voltage exceeds 3 V, the electrons are easily liberated because of the small electronegativity so that the anion is oxidized, and then the shelf stability of the cell tends to deteriorate.

To prevent the oxidation of the anion as described above, it may be contemplated that the electron attractive group is bonded to the atom of the IIIA to VA groups which forms the anion center to stabilize the atom as the anion center. An example of a compound which is stabilized in this way is $LiBF_4$. Though $LiBF_4$ has stability to some extent, its stability is not satisfactory as seen from Comparative Example 2 described later.

According to the first aspect of the present invention, to further stabilize the organic metal salt as the electrolyte, an oxygen atom is bonded to the atom of the IIIA to VA groups which forms the anion center, and the electron attractive group is bonded to the oxygen atom.

While it may be possible to form an organic metal salt from an atom having a high electronegativity such as the VIb group atoms, for example, oxygen and sulfur, the formed organic metal salt cannot function as an electrolyte since only one electron attractive group is bonded to the oxygen atom so that the salt is hardly dissolved in a solvent.

The reason why the electron attractive group is bonded to the anion center atom through the oxygen atom is that the oxygen atom has a high electronegativity so that it can decrease the electron density on the atom forming the anion center and then stabilize the atom forming the anion center against the oxidation, and also the oxygen has two valencies so that it can bond the electron attractive organic group the state of a low steric hindrance.

The electron attractive organic group attracts the electron from the atom forming the anion center through the oxygen atom to decrease the electron density of the atom forming the anion center, whereby it becomes difficult to withdraw the electron from the anion center and thus oxidation of the anion is prevented.

Examples of the electron attractive organic group are a carbonyl group, a sulfonyl group, an amino group, a cyano group, a halogenated alkyl group having 1 to 20 carbon atoms, and the like. Among them, the carbonyl group is preferred, since the organic metal salt having the carbonyl group can be synthesized easily.

Examples of metals which form the salts with the above electron attractive organic group are alkali metals such as lithium, sodium or potassium, alkaline earth metals such as magnesium calcium, and the like. Among them, lithium is preferred.

Preferably, the amount of the metal forming the counter ion is larger than that of the atom forming the anion center. The reason for this will be explained later.

Specific examples of the organic metal salt are compounds of the formula:

or

wherein X and X' are the same or different and each an electron attractive organic group having an oxygen atom which bonds to the boron atom and, for example, a group of the formula: —O—C(=O)— $C_6H_3(R)$—O— or a group of the formula: —O—C(=O)—R'—O— in which R is a hydrogen atom or an alkyl group having 1 to 20 carbon atoms and R' is an alkylene group having 1 to 20 carbon atoms;

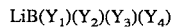

wherein $Y_1$, $Y_2$, $Y_3$ and $Y_4$ are the same or different and each a group of the formula: —O—C(=O)—R, a group of the formula: —O—R or a group of the formula: —C(=O)—O—R provided that at least one of $Y_1$, $Y_2$, $Y_3$ and $Y_4$ is a group of the formula: —O—C(=O)—R; LiN[—OC(=O)$CF_3$][—C(=O)$CF_3$], and the like. Among them, lithium boron disalicylate [LiB(—O—C(=O)—$C_6H_4$—O—)$_2$] is particularly preferred. LiN[—OC(=O)$CF_3$][—C(=O)$CF_3$] may be prepared by neutralizing NH[—C(=O)$CF_3$][—C(=O)$CF_3$] with a basic lithium salt. Lithium boron disalicylate may be prepared by the method described in J. Inorg. Nucl. Chem., 40, (1978) 987 or by mixing boric acid, salicylic acid and a basic lithium salt in a determined molar ratio, reacting them in an organic solvent by heating while removing water and removing the solvent.

Other examples of the organic metal salt which can be used as the electrolyte in the present invention are $LiB(OSO_2R_f)_4$, $LiC(OSO_2R_f)_3$, $LiN(OSO_2R_f)_2$ (wherein $R_f$ is a fluoroalkyl group having 1 to 20 carbon atoms), and the like.

As the atom which forms the anion center, any one of the elements of the IIIA to VA groups of the Periodic Table, such as a boron atom (B), nitrogen (N), a phosphorus atom (P), a gallium atom (Ga), an aluminum atom (Al), a silicon atom (Si), and the like can be used. In view of the valency, the atoms of the IIIA and IVA groups, in particular the atoms of the IIIA group are preferred. In view of the molecular weight of the organic metal salt, the atom having an atomic weight of 70 or less, preferably 30 or less, more preferably 15 or less is desirable.

In view of these factors, the boron atom is particularly preferred, since it has an atomic weight of 10.8 and it provides four bonds which are more than the bonds provided by the oxygen or nitrogen atom when it forms the anion center, so that it can bond with more electron attractive organic groups through the oxygen atom than other atoms which form the anion center.

In the second aspect of the present invention, a molar ratio of the metal forming the corresponding cation to the atom forming the anion center is larger than 1, whereby the shelf stability of the cell is improved.

Preferably, this molar ratio is at least 1.001, more preferably at least 1.005, most preferably at least 1.02.

When this molar ratio exceeds 1.05, the cell characteristics may start to decrease. Then, the molar ratio is preferably 1.05 or less.

The reason why the shelf stability of the cell can be improved when the above molar ratio is larger than 1 may be that the organic metal salt used according to the present invention and a hardly soluble salt such as $Li_2CO_3$ may form a double salt.

The hardly soluble salt such as $Li_2CO_3$ is hardly dissolved in a solvent of the generally used organic electrolytic solution. When it forms the double salt with the organic metal salt, it can be dissolved in such a solvent. In addition, the organic metal salt is preferably further stabilized.

The hardly soluble salt to be used is preferably hardly dissolved in an organic solvent which is used in the common cells. Specific examples of the hardly soluble salts are LiOH, $Li_2CO_3$, LiF, $Li_2SO_4$, $Li_3PO_4$, and the like. Among them, the alkali metal salts such as LiOH and $Li_2CO_3$ are preferred. In particular, $Li_2CO_3$ is preferred.

To calculate the molar ratio of the corresponding cation to the atom forming the anion center, the molar numbers of the cations and anions of the common electrolyte are not taken into account.

Examples of the organic solvent in which the above electrolyte is dissolved in the preparation of the electrolytic solution are ethers (e.g., 1,2-dimethoxyethane, 1,2-dimethoxymethane, dimethoxypropane, 1,3-dioxolane, tetrahydrofuran, 2-methyltetrahydrofuran, 4-methyl-1,3-dioxolane, etc.), esters (e.g., propylene carbonate, ethylene carbonate, butylene carbonate, γ-butyrolactone, γ-valerolactone, etc.), sulfolane, and the like.

Among them, the esters are preferred, since they have less reactivity with the metal salt on the positive electrode at a high voltage of 4.2 V or larger and will improve the shelf stability of the electrolytic solution, when they are used in combination with the electrolyte comprising the above organic metal salt. An amount of the ester in the organic solvent is preferably at least 10% by volume, more preferably at least 20% by volume, most preferably at least 30% by volume.

The concentration of the electrolyte in the electrolytic solution is not critical. Usually, in the organic solvent, the electrolyte comprising the above organic metal salt is dissolved in a concentration of from 0.01 to 2 mol/liter, preferably from 0.05 to 1 mol/liter.

In assembling the cell using the above described electrolytic solution, as a negative electrode, there is used an integral member of an alkali metal or a compound comprising the alkali metal and a collector material such as a stainless steel net.

Examples of the alkali metal are lithium, sodium, potassium, and examples of the compound comprising the alkali metal are alloys of the alkali metals with aluminum, lead, indium, cadmium, tin, magnesium, and the like; a compound of the alkali metal and carbon; and compounds of the lower potential alkali metals with metal oxides or sulfides (e.g. $Nb_2O_6$).

A positive electrode is produced by compounding a positive electrode active material such as a metal oxide (e.g., manganese dioxide, vanadium pentoxide, chromium oxide, lithium cobalt oxide, lithium nickel oxide, etc.) or a metal sulfide (e.g., molybdenum disulfide, etc.) and necessary additives such as a conductive aid or a binder (e.g., polytetrafluoroethylene, etc.), and molding it around a core of a current collector member such as a stainless steel net.

When the metal oxide is used as the positive electrode active material, a high voltage is generated. When the metal oxide which generates the voltage of at least 3 V, in particular at least 4.2 V is used in the positive electrode, the conventional cell comprising $LiBF_4$ or $LiB(C_6H_5)_4$ has decreased shelf stability. But, the electrolytic solution comprising the above organic metal salt to be used according to the present invention does not decrease the shelf stability of the cell at such high voltage. Therefore, the effects of the present invention are remarkably achieved, when the high voltage positive electrode active material is used.

As a specific surface area of the positive electrode active material decreases, the shelf stability of the cell further increases. In the present invention, the positive electrode active material has preferably a surface area of 50 $m^2/g$ or less, more preferably 30 $m^2/g$ or less, especially 20 $m^2/g$ or less.

Preferably, an active surface of the metal oxide of the active electrode active material is treated with a compound of an alkali metal or an alkaline earth metal, since the shelf stability is further improved. When the cell is predischarged after the assembly of the cell, the shelf stability of the cell is improved to some extent.

PREFERRED EMBODIMENTS OF THE INVENTION

The present invention will be illustrated by the following Examples, which do not limit the scope of the present invention in any way. In the Examples, "parts" are by weight.

EXAMPLE 1

Using lithium boron disalicylate having the formula of LiB($-$O$-$C($=$O)$-$C$_6$H$_4$$-$O$-$)$_2$ (hereinafter referred to as "LiBSA") as an electrolyte, an electrolytic solution was prepared. In LiBSA, two electron attractive organic groups of the formula: $-$C($=$O)$-$C$_6$H$_4$$-$ are bonded to the boron atom forming the anion center through the respective oxygen atoms. The molar ratio of the metal element (counter cation) to the atom forming the anion center was 1.02.

First, LiBSA was dissolved in 1,2-dimethoxyethane (DME), and to the mixture, propylene carbonate (PC) was added and mixed to obtain an electrolytic solution. A volume ratio of propylene carbonate to 1,2-dimethoxyethane was 1:2, and a concentration of the LiBSA in the electrolytic solution was 0.6 mol/l. The composition of this electrolytic solution is expressed by "0.6 mol/l LiBSA/PC:DME (volume ratio of 1:2)".

A mass of electrolytic manganese dioxide was heat treated and further treated with an aqueous solution of lithium hydroxide to obtain an active material having a specific surface area of 18 m$^2$/g. The manganese oxide active material (100 parts), carbon black (5 parts) and polytetrafluoroethylene powder (5 parts) were mixed, and the mixture was coated over both surfaces of a stainless steel net to form a sheet having a thickness of 0.4 mm and a width of 30 mm. After bonding a stainless steel net current collector to the sheet-form positive electrode, the electrode was dried at 250° C., and cooled down to room temperature in a dry atmosphere.

Then, the sheet-form positive electrode was sandwiched between a pair of microporous polypropylene films each having a thickness of 25 μm as separators. Over the sandwiched positive electrode, there was laminated a negative electrode comprising a sheet form lithium having a thickness of 0.18 mm and a width of 30 mm which was press bonded to a stainless steel net. Then, the laminated positive and negative electrodes were spirally wound to form a spiral electrode body, which was inserted in a cell case having a cylinder form with a bottom and an outer diameter of 15 mm.

After spot welding lead wires for the positive and negative electrodes, the above prepared electrolytic solution was filled in the cell case.

Thereafter, the opening of the cell case was sealed by a conventional method, and the cell was predischarged and aged at 60° C. for 3 days to produce an organic electrolytic solution cell having a structure of the Figure.

The cell of the Figure comprises a positive electrode 1, a negative electrode 2, a separator 3 and an electrolytic solution 4. For simplicity, the stainless steel nets used in the production of the positive and negative electrodes 1 and 2, and current collectors are not shown.

The cell further comprises a cell case 5 made of stainless steel, and the cell case 5 functions also as a negative electrode terminal. At the bottom of the cell case, an insulator 6 made of a polytetrafluoroethylene sheet is provided. On the inner peripheral wall surface of the cell case, an insulator 7 made of a polytetrafluoroethylene sheet is provided. The spiral electrode body consisting of the positive and negative electrode 1, 2 and the separator 3, and the electrolytic solution 4 are contained in the cell case 5.

The opening of the cell case 5 is closed with a sealing plate 8 made of stainless steel. The sealing plate has a gas vent hole 8a at its center. The sealing section has an annular packing 9 made of polypropylene, a flexible thin plate 10 made of titanium, and a thermally deformable annular member 11 made of polypropylene.

Since the thermally deformable member 11 is deformed by the temperature change, it changes a breaking pressure of the flexible plate 10.

The cell further comprises a terminal plate made of rolled steel plate 12 plated by nickel. The plate 12 has a cutting edge 12a and a gas vent hole 12b. When a gas is generated in the cell and the internal pressure increases, the flexible thin plate 10 is deformed by the increased internal pressure and broken by the cutting edge 12a, then the gas in the cell is exhausted through the hole 12b, whereby the breakage of the cell is prevented.

The cell has an insulating packing 13 and a lead member 14. The lead member 14 electrically connects the positive electrode 1 and the sealing plate 8, and the terminal plate 12 functions as the positive electrode terminal since it contacts to the sealing plate 8. A lead member 15 electrically connects the negative electrode 2 and the cell case 5.

EXAMPLE 2

In the same manner as in Example 1 except that LiBSA in which the molar ratio of the metal element (corresponding cation) to the atom forming the anion center was 1.00 was used, the cell having the structure of the Figure was produced.

Comparative Example 1

In a mixed solvent of PC and DME in a volume ratio of 1:2, LiB(C$_6$H$_5$)$_4$.3DME was dissolved to obtain an electrolytic solution having a composition of "0.6 mol/l LiB(C$_6$H$_5$)$_4$/PC:DME (1:2)". The molar ratio of the metal element (counter cation) to the atom forming the anion center of LiB(C$_6$H$_5$)$_4$.3DME was 1.00.

In the same manner as in Example 1 except that this electrolytic solution was used, a cylindrical organic electrolytic solution cell having the structure of the Figure was assembled.

Comparative Example 2

In a mixed solvent of PC and DME in a volume ratio of 1:2, LiBF$_4$ was dissolved to obtain an electrolytic solution having a composition of "0.6 mol/l LiBF$_4$/PC:DME (1:2)". The molar ratio of the metal element (counter cation) to the atom forming the anion center of LiBF$_4$ was 1.00.

In the same manner as in Example 1 except that this electrolytic solution was used, a cylindrical organic electrolytic solution cell having the structure of the Figure was assembled.

With each of the cells assembled in Examples 1 and 2 and Comparative Examples 1 and 2, a minimum voltage was measured when the cell was discharged at 3 A for 0.5 second. Each cell was stored at 80° C. for 10 days, and the minimum voltage was measured in the same manner as above and compared with the original minimum voltage before storing to check the degradation of the property of each cell. The results are shown in Table 1.

Separately, each of another set of cells was charged at 100 mA up to 3.5 V, and the minimum voltage was measured when each cell was discharged at 0.3 A for 10 msec. Then, the cell was stored under the constant voltage condition of 3.5 V at 80° C. for 10 days, and thereafter the minimum voltage was measured under the same conditions as above to determine the deterioration of the call property. The results are also shown in Table 2.

TABLE 1

| Example No. | Minimum voltage (V) after discharge at 3 A for 0.5 sec. | |
|---|---|---|
| | Before storage | After storage |
| Ex. 1 | 1.37 | 1.06 |
| Ex. 2 | 1.36 | 1.01 |
| Comp. 1 | 1.06 | 0.02 |
| Comp. 2 | 1.30 | <0.00 |

TABLE 2

| Example No. | Minimum voltage (V) after discharge at 0.3 A for 10 msec. | |
|---|---|---|
| | Before storage | After storage |
| Ex. 1 | 3.07 | 2.93 |
| Ex. 2 | 3.05 | 2.85 |
| Comp. 1 | *1) | — |
| Comp. 2 | 3.10 | 0.94 |

Note:
*1) The cell could not be charged up to 3.5 V.

As seen from the results of Table 1, after the storage under the severe conditions of 80° C. for 10 days, the minimum voltages of the cells of Examples 1 and 2 decreased from 1.37 V to 1.06 V and from 1.36 V to 1.01 V, but these decreases of the minimum voltage were much smaller than those found in the cells of Comparative Examples 1 and 2. The cell of Example 2 had still good shelf stability while the stability might be slightly worse than that of Example 1 since the molar ratio of the metal element (corresponding cation) to the atom forming the anion center in Example 2 was slightly smaller than that in Example 1.

That is, with the cell of Comparative Example 1 using $LiB(C_6H_5)_4$ as the electrolyte, the minimum voltage decreased from 1.06 V to 0.02 V, and with the cell of Comparative Example 2 using $LiBF_4$ as the electrolyte, the minimum voltage decreased from 1.30 V to 0.00 V. These comparative cells cannot be used practically.

As seen from the results of Table 2, the cells of Examples 1 and 2 using the electrolyte in which the electron attractive group is bonded to the anion center atom through the oxygen atom showed the small decrease of voltage even at a high voltage of 3.5 V or higher and had good shelf stability in comparison with the cell of Comparative Example 2 using the electrolyte having the electron attractive group which is not bonded to the anion center atom through the oxygen atom. The cell of Comparative Example 3 which used the electrolyte having no electron attractive group could not be charged up to 3.5 V since the electrolyte was decomposed before the voltage reached 3.5 V.

These results show that the cell of the present invention has much better shelf stability than the conventional cells.

What is claimed is:

1. An organic electrolytic solution cell comprising a positive electrode, a negative electrode which is made of an alkali metal or a compound comprising an alkali metal and an organic electrolytic solution which contains, as an electrolyte, an organic metal salt comprising an atom selected from the group consisting of the elements of groups IIIA to VA of the Periodic Table which forms an anion center and an electron attractive organic group bonded to said atom through an oxygen atom.

2. The organic electrolytic solution cell according to claim 1, wherein said organic metal salt comprises an atom having an atomic weight of 30 or less as said atom forming the anion center.

3. The organic electrolytic solution cell according to claim 2, wherein said atom is boron.

4. The organic electrolytic solution cell according to claim 1, wherein said organic metal salt is a boron-containing salt of the formula:

$$LiBXX'$$

or $$LiB(=O)X$$

wherein X and X' are the same or different and each an electron attractive organic group having an oxygen atom which bonds to the boron atom; or $$LiB(Y_1)(Y_2)(Y_3)(Y_4)$$

wherein $Y_1$, $Y_2$, $Y_3$ and $Y_4$ are the same or different and each a group of the formula: —O—C(=O)—R, a group of the formula: —O—R or a group of the formula: —C(=O)—O—R provided that at least one of $Y_1$, $Y_2$, $Y_3$ and $Y_4$ is a group of the formula: —O—C(=O)—R.

5. The organic electrolytic solution cell according to claim 4, wherein the group X or X' is a group of the formula: —O—C(=O)—$C_6H_3$(R)—O— or a group of the formula: —O—C(=O)—R'—O— in which R is a hydrogen atom or an alkyl group having 1 to 20 carbon atoms and R' is an alkylene group having 1 to 20 carbon atoms.

6. The organic electrolytic solution cell according to claim 4, wherein said boron-containing salt is lithium boron disalicylate.

7. The organic electrolytic solution cell according to claim 1, wherein said organic metal salt is a salt of the formula:

$$LiN[—OC(=O)CF_3][—C(=O)CF_3].$$

8. An organic electrolytic solution cell comprising a positive electrode, a negative electrode which is made of an alkali metal or a compound comprising an alkali metal, and an organic electrolytic solution which contains, as an electrolyte, an organic metal double salt comprising an atom which forms an anion center and a corresponding cation in a molar ratio of said corresponding cation to said anion center atom of larger than 1.

9. The organic electrolytic solution cell according to claim 8, wherein said molar ratio is at least 1.005.

10. The organic electrolytic solution cell according to claim 8, wherein said molar ratio is not larger than 1.05.

11. The organic electrolytic solution cell according to claim 8, wherein said molar ratio of said corresponding cation to said anion center atom is at least 1.02, and said organic metal double salt is a double salt with a hardly soluble salt selected from the group consisting of LiOH, $Li_2CO_3$, LiF, $Li_2SO_4$ and $Li_3PO_4$.

12. The organic electrolytic solution cell according to claim 8, wherein said molar ratio of said corresponding cation to said anion center atom is from 1.02 to 1.05, and said organic metal double salt is a double salt with $Li_2CO_3$.

13. The organic electrolytic solution cell according to claim 1, wherein said organic metal salt is a salt selected from the group consisting of $LiB(OSO_2R_f)_4$, $LiC(OSO_2R_f)_3$, and $LiN(OSO_2R_f)_2$, wherein $R_f$ is a fluoroalkyl group having 1 to 20 carbon atoms.

14. The organic electrolytic solution cell according to claim 8, wherein said organic electrolytic solution contains an organic solvent which is an ether, ester or sulfolane.

15. The organic electrolytic solution cell according to claim 8, wherein said organic electrolytic solution contains an organic solvent which is a member selected from the group consisting of propylene carbonate, ethylene carbonate, butylene carbonate, gamma-butyrolactone, and gamma-valerolactone.

16. The organic electrolytic solution cell according to claim 8, wherein said molar ratio of said corresponding cation to said anion center atom is at least 1.02, and said organic metal double salt is a double salt of a first organic metal salt and a different second hardly soluble salt selected from the group consisting of LiOH, $Li_2CO_3$, LiF, $Li_2SO_4$ and $Li_3PO_4$.

17. The organic electrolytic solution cell according to claim 8, wherein said molar ratio of said corresponding cation to said anion center atom is from 1.02 to 1.05, and said organic metal double salt is a double salt of a first organic metal salt and a different second hardly soluble salt which is $Li_2CO_3$.

* * * * *